US010748666B2

(12) United States Patent
Li et al.

(10) Patent No.: US 10,748,666 B2
(45) Date of Patent: Aug. 18, 2020

(54) HEAD MODULE, LARGE-SCALE CONTAINER AND METHOD FOR MANUFACTURING THE BOTH

(71) Applicants: State Nuclear Power Technology Corporation Ltd., Beijing (CN); Shandong Nuclear Power Equipment Manufacturing Co. Ltd., Haiyang, Shandong Province (CN); Shanghai Nuclear Engineering Research and Design Institute, Shanghai (CN); Shandong Electric Power Engineering Consulting Institute Corporation Limited, Jinan, Shandong (CN)

(72) Inventors: Jun Li, Haiyang (CN); Guobiao Wang, Haiyang (CN); Zhongwei Yang, Haiyang (CN); Guizhen Yan, Haiyang (CN); Honghui Ge, Shanghai (CN); Shenhui Zhai, Shandong (CN); Jin Han, Haiyun (CN); Shenghua Liu, Shanghai (CN); Ting Xu, Shanghai (CN); Laiyun Chen, Shanghai (CN); Xiaoping Peng, Shanghai (CN)

(73) Assignees: State Nuclear Power Technology Corporation Ltd., Beijing (CN); Shandong Nuclear Power Equipment Manufacturing Co., Ltd., Haiyang, Shandong Province (CN); Shanghai Nuclear Engineering Research and Design Institute, Shanghai (CN); Shandong Electric Power Engineering Consulting Institute Corporation Limited, Jinan, Shandong (CN)

( * ) Notice: Subject to any disclaimer, the term of this patent is extended or adjusted under 35 U.S.C. 154(b) by 1565 days.

(21) Appl. No.: 14/248,783

(22) Filed: Apr. 9, 2014

(65) Prior Publication Data
US 2014/0254739 A1    Sep. 11, 2014

Related U.S. Application Data

(63) Continuation of application No. PCT/CN2012/082457, filed on Sep. 29, 2012.

(30) Foreign Application Priority Data

Oct. 11, 2011 (CN) .......................... 2011 1 0306772

(51) Int. Cl.
*G21C 9/00* (2006.01)
*G21C 11/00* (2006.01)
(Continued)

(52) U.S. Cl.
CPC ............ *G21C 11/00* (2013.01); *B65D 90/024* (2013.01); *B65D 90/025* (2013.01); *E04H 7/06* (2013.01); *Y10T 29/49826* (2015.01)

(58) Field of Classification Search
CPC ........ G21C 11/00; G21C 11/02; G21C 13/00; G21C 13/093; G21C 11/22; G21C 13/02; G21C 13/024; G21C 13/028
(Continued)

(56) References Cited

U.S. PATENT DOCUMENTS 2,629,354 A * 2/1953 Gay ....................... B21D 51/24
220/586
2,869,749 A * 1/1959 Arne ....................... B65D 90/54
220/565

(Continued)

FOREIGN PATENT DOCUMENTS

CN           2103047 U      4/1992
CN        101332555 A      12/2008
(Continued)

OTHER PUBLICATIONS

The Structural Analysis of the Loviisa Plant Steel Containments for Service Life Extension, Proceedings of 14th International Conference on Nuclear Engineering Jul. 17-20, 2006, Miami, Florida, USA.*

(Continued)

*Primary Examiner* — Marshall P O'Connor
(74) *Attorney, Agent, or Firm* — Peacock Law P.C.; Janeen Vilven

(57) ABSTRACT

A head module for a large-scale container, a large-scale container having the head module, and methods for manu-
(Continued)

facturing the head module and the large-scale container. The method for manufacturing a head module comprises providing a head having an annular opening, the head being composed of a plurality of petals, providing a plurality of cylinder plates, and forming a head cylindrical ring, connecting in order the plurality of cylinder plates to the end surface of the annular opening and joining facing sides of all adjacent cylinder plates. Based on the unfitness of the petals at the annular opening of the head, gaps between adjacent cylinder plates may be adjusted, and/or the positions of the cylinder plates on the end surface of the annular opening of the head may be adjusted radially inwards or outwards.

11 Claims, 5 Drawing Sheets

(51) Int. Cl.
*B65D 90/02* (2019.01)
*E04H 7/06* (2006.01)

(58) Field of Classification Search
USPC .......................................... 376/294, 205, 293
See application file for complete search history.

(56) References Cited

U.S. PATENT DOCUMENTS

| | | | | | |
|---|---|---|---|---|---|
| 2,982,713 | A | * | 5/1961 | North, Jr. ................ | D04H 11/08 122/459 |
| 2,997,435 | A | * | 8/1961 | Mitchell .................. | G21C 1/12 165/154 |
| 3,087,883 | A | * | 4/1963 | Haftke ...................... | F17C 1/00 220/565 |
| 3,098,023 | A | * | 7/1963 | Schluderberg ......... | G21C 13/02 165/11.1 |
| 3,108,704 | A | * | 10/1963 | Rooney .................. | B65D 90/12 220/560.05 |
| 3,113,915 | A | * | 12/1963 | Webb ..................... | G21C 13/00 250/515.1 |
| 3,245,179 | A | * | 4/1966 | Hawkins ................ | G21C 13/00 376/289 |
| 4,047,632 | A | * | 9/1977 | Schilling .............. | G21C 13/073 220/315 |
| 4,632,617 | A | * | 12/1986 | Pechacek ................. | B01J 3/048 212/225 |
| 5,791,107 | A | * | 8/1998 | Danisch ................. | G21C 9/001 376/294 |
| 7,946,439 | B1 | * | 5/2011 | Toscano ............... | B65D 90/503 220/62.17 |

FOREIGN PATENT DOCUMENTS

| | | |
|---|---|---|
| CN | 101524726 A | 9/2009 |
| CN | 101829856 A | 9/2010 |
| CN | 101967886 A | 2/2011 |
| JP | 4320995 A | 11/1992 |

OTHER PUBLICATIONS

Varpasuo et al., "The Structural Analysis of the Loviisa Plant Steel Containments for Service Life Extension", Proceedings of 14th International Conference on Nuclear Engineering Jul. 17-20, 2006, Miami, Florida, USA (retrieved on Jul. 30, 2018 on https://www.researchgate.net/publication/262697974_The_Structural_Analy.*

Beall, "Masonry and Concrete", ch. 5, retrieved on Jul. 30, 2018 from Digital Engineering Library @ McGraw-Hill (www.digitalengineeringlibrary.com), Copyright © 2004 The McGraw-Hill Companies.*

Lee et al., "Modularizing Containment Vessels in New Nuclear Power Plants", published on http://www.powermag.com on Nov. 1, 2009, retrieved from https://www.powermag.com/modularizing-containment-vessels-in-new-nuclear-power-plants/?printmode=1 on Jul. 30, 2018.*

An English Machine Translation of Shinsuke, JPH04320995 (A), download from URL https://worldwide.espacenet.com/ on Jan. 21, 2019. (Year: 1992).*

"Brazil App. No. 12014008605-2 Written Opinion", dated Dec. 10, 2019, 1-6.

* cited by examiner

HEAD MODULE, LARGE-SCALE CONTAINER AND METHOD FOR MANUFACTURING THE BOTH

CROSS-REFERENCE TO RELATED APPLICATIONS

This application is a continuation application of Patent Cooperation Treaty Application No. PCT/CN2012/082457, entitled "Head Module, Large-scale Container and Method for Manufacturing the Both", to State Nuclear Power Technology Corporation Ltd., et al., filed on Sep. 29, 2012, which claims priority to Chinese Patent Application No. 201110306772.4, filed on Oct. 11, 2011, and the specifications and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention

The present invention relates to manufacturing a large-scale container and a head module thereof, in particular to a large-scale container and a head module thereof used in nuclear, chemical, petroleum storage or smelting field, and methods for manufacturing the both.

2. Description of the Related Art

In a large reactor nuclear power plant, a steel safety shell is usually used. FIG. 1 illustrates an exemplary embodiment of such a large steel safety shell 500. The steel safety shell 500 is often formed by connecting together multiple assembling modules including an intermediate cylindrical body 51, and top and bottom heads 52 and 53 provided respectively at both ends of the cylindrical body 51.

In the above safety shell 500, the intersection line 54 between the cylindrical body 51 and the top head 52 and the intersection line 55 between the cylindrical body 51 and the bottom head 53 are used as the dividing lines.

However, the above module dividing method has the following disadvantages:

1) In order to prevent adverse affection on the ovality of the intersection line during transporting or lifting the bottom head so as to ensure the level of the intersection line of the bottom head, it is necessary to provide a reserved portion as a cutting margin (for example, 100 mm) at the open end of the annular opening of the bottom head. But the cutting margin is too large and increases material cost.

2) In order to strengthen the stiffness of the open end of the bottom head during lifting, a reinforcing ring needs to be welded to an upper section of the reserved portion, which not only additionally adds one assembling step, but also further increases the material cost.

3) After the bottom head is located at the nuclear island area, the cutting line for the intersection line of the bottom head is measured and determined on-site, and then the margin at one side of the cutting intersecting line is cut off at the nuclear island site. However, since the measuring of the intersection line and the margin cutting are performed at the nuclear island area and there are more cross-constructions, the construction process is affected by more other side constraint factors. That is, the schedule of the measuring of the intersection line and the margin cutting cannot be self-controlled by the construction party for assembling the bottom head.

4) When assembling together the bottom head, the cylindrical body and the top head, because the unfitness of joint circular seams may be out of tolerance and it is difficult to adjust or control the unfitness, the assembling progress may be slowed down and the final installation quality may be affected.

SUMMARY OF THE INVENTION

The present invention has been made to overcome or alleviate at least one aspect of the above mentioned disadvantages.

According to a first aspect of the present invention, there is provided a method for manufacturing a head module of a large-scale container, comprising steps of: providing a head having an annular opening, the head being composed of a plurality of petals; providing a plurality of plates to form the cylinder, herein referred to as cylinder plates; and forming a head cylindrical ring, comprising connecting in order the plurality of cylinder plates to the end surface of the annular opening and joining facing sides of all adjacent cylinder plates.

Alternatively, the step of forming a head cylindrical ring further comprises, before connecting in order the plurality of cylinder plates to the end surface of the annular opening, making the end surface of the annular opening of the head be consistent with a theoretical intersection line of the head. Further, the step of connecting in order the plurality of cylinder plates to the end surface of the annular opening and joining facing sides of all adjacent cylinder plates comprises, based on the unfitness of the petals at the annular opening of the head, adjusting gaps between adjacent cylinder plates, and/or adjusting radially inwards or outwards the positions of the cylinder plates on the end surface of the annular opening of the head. And the step of making the end surface of the annular opening of the head be consistent with a theoretical intersection line of the head may comprise cutting and polishing the end surface of the annular opening of the head.

In the above method, alternatively, the head module is made of steel plates, and by welding, the petals are assembled together, the cylinder plates are connected to the end surface of the annular opening of the head, and the facing sides of the adjacent cylinder plates are joined.

In the above method, the head module may comprise a bottom head module or top head module of a steel safety shell used in a nuclear power plant (hereinafter referred to as steel safety shell).

In the above method, the outer diameter of the annular opening may be greater than 8 meters.

According to a second aspect of the present invention, there is provided a method for manufacturing a head module of a large-scale container, the head module including a head and a head cylindrical ring formed integrally with the head, the method comprising steps of: providing the head cylindrical ring; making the end surface of one end of the head cylindrical ring be consistent with a theoretical intersection line of the head; and joining a plurality of petals, based on the end surface of the one end of the head, to form the head. The step of making the end surface of one end of the head cylindrical ring be consistent with a theoretical intersection line of the head may comprise cutting and polishing the one end of the head cylindrical ring.

Alternatively, the head module is made of steel plates, and by welding, the petals are assembled together, and the corresponding petals and the head cylindrical ring are connected together. Further, the head module comprises a top head module of the steel safety shell.

Alternatively, the outer diameter of an annular opening of the head is greater than 8 meters.

According to a third aspect of the present invention, there is provided a method for manufacturing a large-scale container, comprising steps of: providing a first head having an annular opening at a first site, the first head being composed of a plurality of first petals; providing a first head cylindrical ring to the annular opening of the first head at the first site to form a first head module; forming a cylindrical body at a second site different from the first site, based on the size of the first head cylindrical ring; and assembling the first head module and the cylindrical body, the first head module being located at one end of the cylindrical body in an axial direction of the cylindrical body, wherein the cross section of the first head cylindrical ring perpendicular to the axial direction is the same as the cross section of the one end of the cylindrical body perpendicular to the axial direction.

Alternatively, the step of providing a first head cylindrical ring includes: making the end surface of the annular opening of the first head be consistent with a theoretical intersection line of the first head; providing a plurality of first cylinder plates; and connecting in order the plurality of first cylinder plates to the end surface of the annular opening of the first head and joining facing sides of all adjacent first cylinder plates to form the first head cylindrical ring. Further, the step of connecting in order the plurality of cylinder plates to the end surface of the annular opening of the first head and joining facing sides of all adjacent first cylinder plates comprises, based on the unfitness of the first petals at the annular opening of the first head, adjusting gaps between adjacent first cylinder plates, and/or adjusting radially inwards or outwards the positions of the first cylinder plates on the end surface of the annular opening of the first head. Still further, the step of making the end surface of the annular opening of the first head be consistent with a theoretical intersection line of the first head comprises cutting and polishing the end surface of the annular opening of the first head.

Alternatively, the method further comprises forming a second head module at a third site different from the second site, based on the size of the other end of the cylindrical body in the axial direction; and assembling the second head module to said the other end of the cylindrical body.

Alternatively, the step of forming a second head module comprises: providing at the third site a second head having an annular opening, the second head being composed of a plurality of petals; providing at the third site a second head cylindrical ring to the annular opening of the second head to form the second head module, wherein the cross section of the second head cylindrical ring perpendicular to the axial direction is the same as the cross section of said the other end of the cylindrical body perpendicular to the axial direction.

More specifically, the step of providing a second head cylindrical ring comprises: making the end surface of the annular opening of the second head be consistent with a theoretical intersection line of the second head; providing a plurality of second cylinder plates; and connecting in order the plurality of second cylinder plates to the end surface of the annular opening of the second head and joining facing sides of all adjacent second cylinder plates to form the second head cylindrical ring. Further, the step of connecting in order the plurality of second cylinder plates to the end surface of the annular opening of the second head and joining facing sides of all adjacent second cylinder plates to form the second head cylindrical ring comprises, based on the unfitness of the petals at the annular opening of the second head, adjusting gaps between adjacent second cylinder plates, and/or adjusting radially inwards or outwards the positions of the second cylinder plates on the end surface of the annular opening of the second head. The step of making the end surface of the annular opening of the second head be consistent with a theoretical intersection line of the second head may comprise cutting and polishing the end surface of the annular opening of the second head.

Alternatively, the step of forming a second head module comprises: forming a second head cylindrical ring at the third site, based on the size of said the other end of the cylindrical body, wherein one end of the second head cylindrical ring is adapted to be connected with said the other end of the cylindrical body, and the cross section of said one end of the second head cylindrical ring perpendicular to the axial direction is the same as the cross section of said the other end of the cylindrical body perpendicular to the axial direction; and joining a plurality of second petals to form a second head, based on the size of the second head cylindrical ring, and connecting the second head cylindrical ring to an annular opening of the second head. Alternatively, the step of joining a plurality of second petals to form a second head comprises: making the end surface of the other end of the second head cylindrical ring be consistent with a theoretical intersection line of the second head; and joining the second petals, based on the end surface of said the other end of the second head cylindrical ring, to form the second head. Further, the step of making the end surface of the other end of the second head cylindrical ring be consistent with a theoretical intersection line of the second head comprises cutting and polishing said the other end of the second head cylindrical ring.

In the method according to the third aspect, the cylindrical body, the first and second head cylindrical rings may have a circular cylinder shape. Further, the large-scale container may comprise the steel safety shell.

Alternatively, the cylindrical body is divided into n intermediate cylindrical rings, wherein n is the smallest natural number which is greater than 1 and meets the following condition: $n \times Q \geq W$, wherein Q is the maximum weight that can be lifted at the site for a single lifting, and W is the weight of the cylindrical body.

Alternatively, the outer diameter of the annular opening is greater than 8 meters.

According to a fourth aspect of the present invention, there is provided a head module for a large-scale container, the head module being adapted to be connected with one end of a cylindrical body of the large-scale container, wherein the head module comprises: a head composed of a plurality of petals and having an annular opening; and a head cylindrical ring, one end of which is connected to the annular opening, and the other end of which is adapted to be connected with the one end of the cylindrical body, wherein the head cylindrical ring comprises a plurality of cylinder plates, each cylinder plate being connected to the end surface of the annular opening of the head, and facing sides of all adjacent cylinder plates being joined. Alternatively, the outer diameter of the annular opening is greater than 8 meters.

According to a fifth aspect of the present invention, there is provided a large-scale container, comprising: a first head module; a cylindrical body, the first head module being connected to one end of the cylindrical body in an axial direction of the cylindrical body, wherein the first head module comprises: a first head composed of a plurality of petals and having an annular opening; and a first head cylindrical ring, one end of which is connected to the annular opening of the first head, and the other end of which is adapted to be connected with the one end of the cylindrical body. The first head cylindrical ring comprises a plurality of first cylinder plates, each first cylinder plate being connected to the end surface of the annular opening of the first head, and facing sides of all adjacent first cylinder plates being joined; and the cross section of said the other end of the first head cylindrical ring perpendicular to the axial direction is the same as the cross section of the one end of the cylindrical body perpendicular to the axial direction. Alternatively, the outer diameter of the annular opening is greater than 8 meters.

Alternatively, the large-scale container further comprises: a second head module, connected to the other end of the cylindrical body in the axial direction, wherein the second head module comprises: a second head composed of a plurality of petals and having an annular opening; and a second head cylindrical ring, one end of which is connected to the annular opening of the second head, and the other end of which is adapted to be connected with said the other end of the cylindrical body. The second head cylindrical ring comprises a plurality of second cylinder plates, each second cylinder plate being connected to the end surface of the annular opening of the second head, and facing sides of all adjacent second cylinder plates being joined; and the cross section of said the other end of the second head cylindrical ring perpendicular to the axial direction is the same as the cross section of said the other end of the cylindrical body perpendicular to the axial direction. The large-scale container may comprise the steel safety shell, in this case, the cylindrical body may be divided into n intermediate cylindrical rings, wherein n is the smallest natural number which is greater than 1 and meets the following condition: $n \times Q \geq W$, wherein Q is the maximum weight that can be lifted at the site for a single lifting, and W is the weight of the cylindrical body.

BRIEF DESCRIPTION OF THE DRAWINGS

The above and other features of the present invention will become more apparent by describing in detail exemplary embodiments thereof with reference to the accompanying drawings, in which:

FIG. 3 is an illustrative view schematically showing an assembling holder for a bottom head module of the steel safety shell according to an embodiment of the present invention, wherein FIG. 3a is a top view, and FIG. 3b is a sectional view along line 1-1;

FIG. 4 is an illustrative view schematically showing an assembling holder for a top head module of the steel safety shell according to an embodiment of the present invention, wherein FIG. 4a is a top view, and FIG. 4b is a sectional view along line 3-3;

DETAILED DESCRIPTION OF PREFERRED EMBODIMENTS OF THE INVENTION

Figure 1:
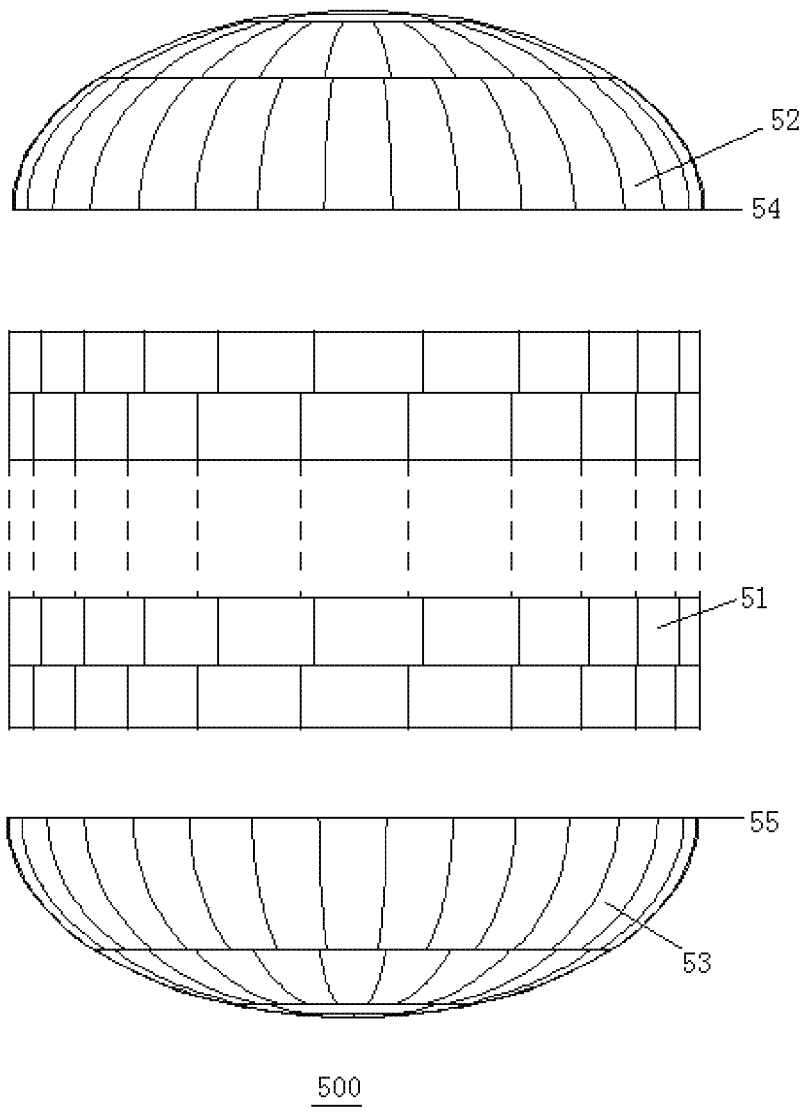
FIG. 1 is an illustrative view showing a module dividing for a steel safety shell in prior arts.
Figure 2:
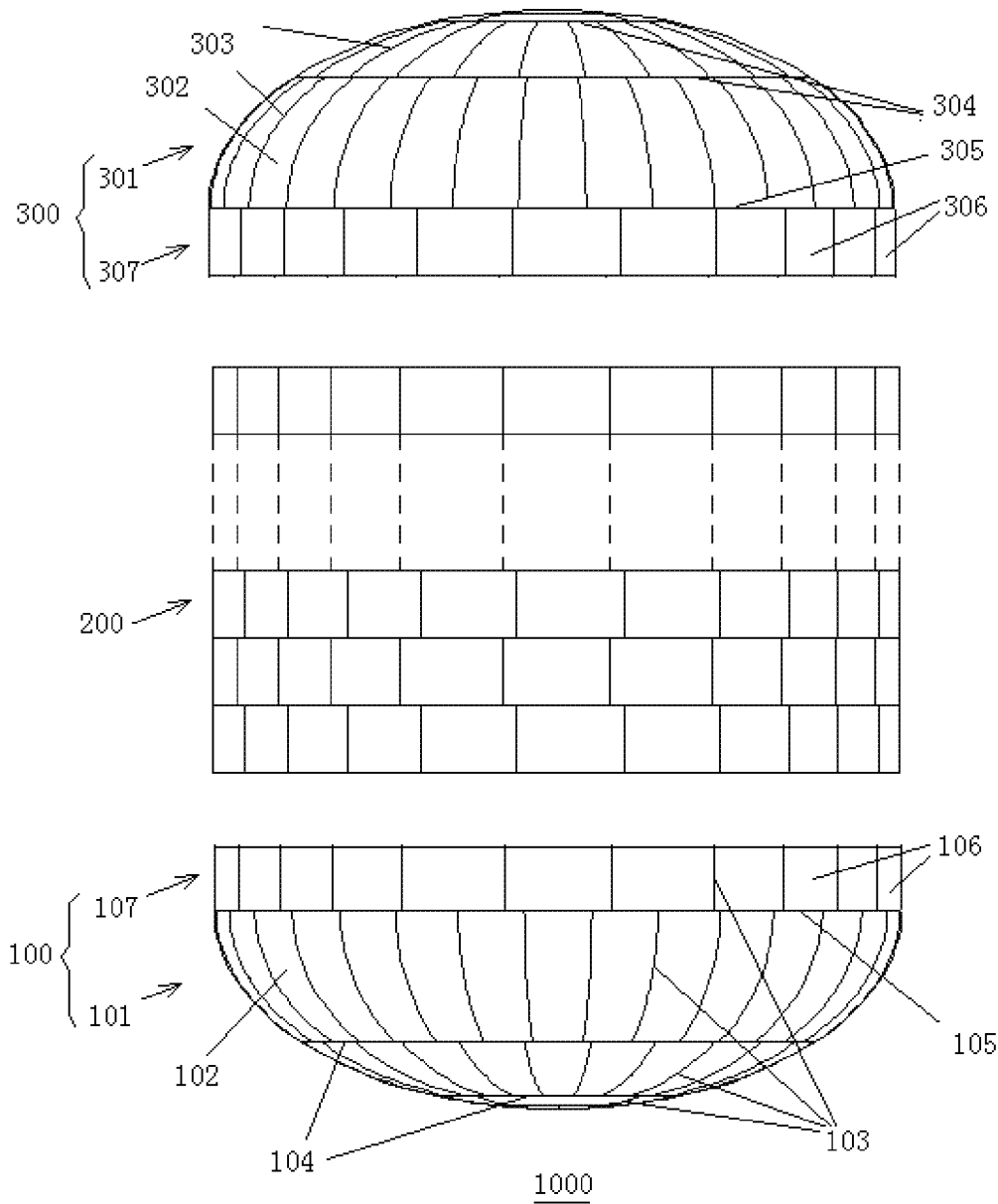
FIG. 2 is an illustrative view showing a module dividing method for a steel safety shell according to an embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

A method for manufacturing a large-scale container will be described with reference to FIGS. 2-6. Though the large-scale containers in the embodiments of the present invention are specified as the steel safety shell for example, it should be noted that the large-scale container is not limited to this, and can be safety shells of other type in the nuclear power plant, or large-scale containers used in chemical, petroleum storage or smelting field. In other words, the methods explained by reference to the steel safety shell may be applied to other large-scale containers. In the large-scale containers in the present invention, the container body and head thereof cannot be made by once-forming process or rolling process due to too large size and weight, and have to be formed by assembling. For instance, the head and cylindrical body of the steel safety shell are respectively formed by joining or assembling petals and by joining or assembling cylinder plates.

Manufacturing a bottom head module 100 of the steel safety shell 1000 comprises the following steps:

1) Completing the preparing work for manufacturing the bottom head module 100, that is, installing an assembling holder 600 for the bottom head module; manufacturing petals 102 for forming a bottom head 101, and head cylinder plates 106, wherein a reserved portion as a cutting margin of 5 mm-10 mm is provided at one end of the uppermost petal ring of the bottom head closer to the intersection line. The petals of the bottom head are adapted to be placed to the holder 600 shown in FIG. 3, and circular and longitudinal assembling or seam gaps between the petals 102 are adapted to be adjusted and fixed by means of locating jigs 400.

Figure 3:
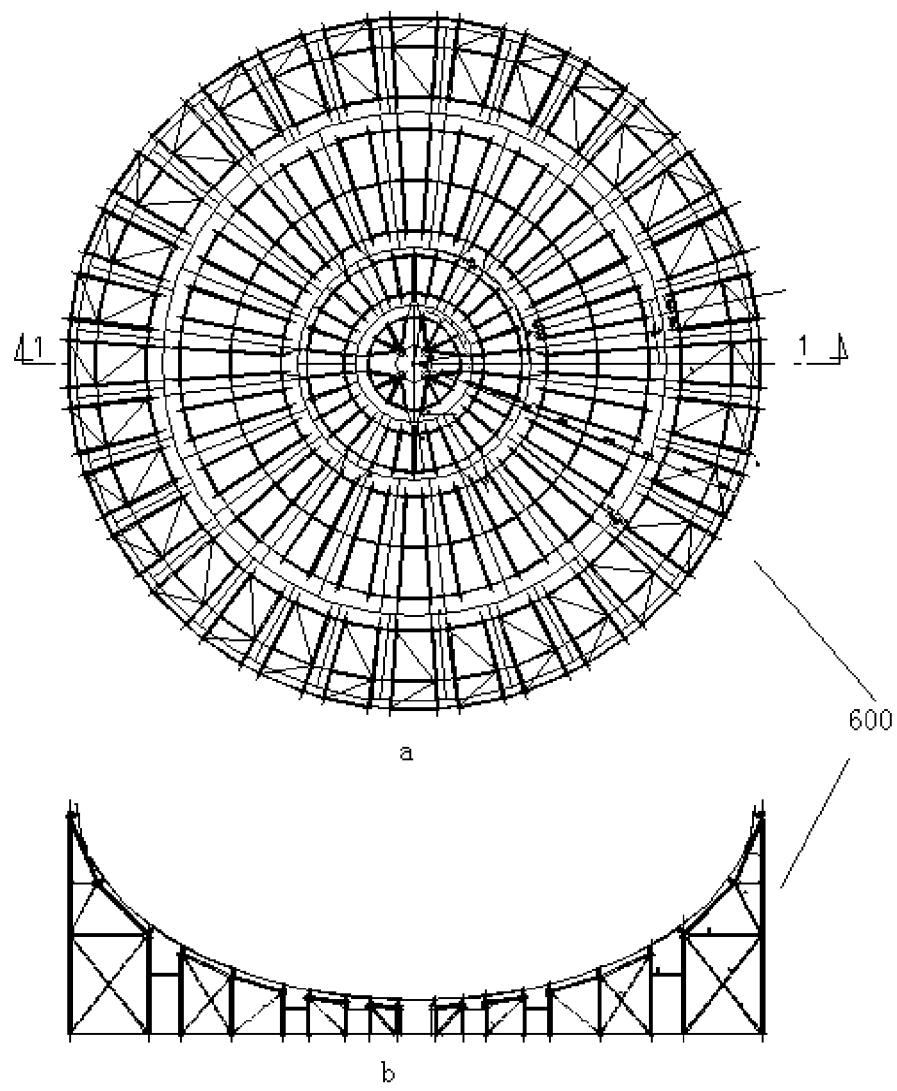
Figure 5:
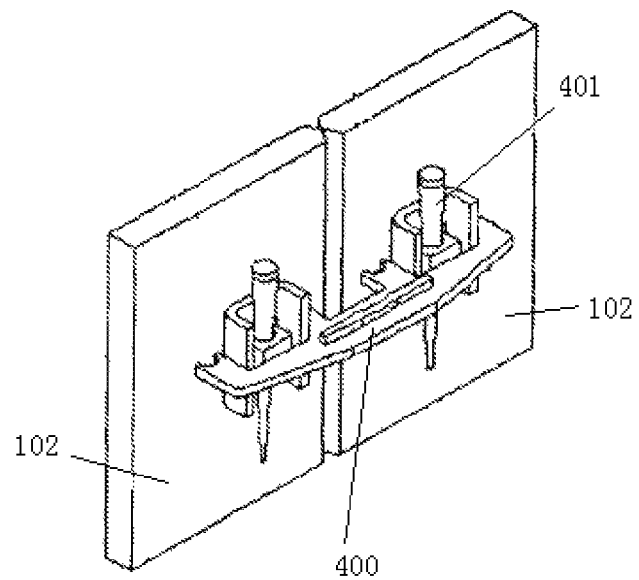
FIG. 5 is an illustrative view showing a positioning device.

2) Assembling or joining the lowermost petals 102 of the bottom head on the holder 600 shown in FIG. 3, and as shown in FIG. 5, the relative position between petals 102 is adjusted by changing inserting amounts of tapered members 401. The locating jigs 400 may be used for locating between a petal and a head cylinder plate as well as between head cylinder plates.

3) Welding the seams between the petals 102 in the lowermost petal ring of the bottom head 101.

4) Assembling or joining a second petal ring on the holder 600, specifically, a longitudinal seam gap between the petals in the second petal ring is adjusted by the locating jig 5 shown in FIG. 5 which is mounted to adjacent petals in the second petal ring, and a circular seam gap between the lowermost petal ring and the second petal ring is adjusted by the locating jig 5 which is mounted to one petal in the lowermost petal ring and to an adjacent petal in the second petal ring.

5) Welding the longitudinal seams 103 between the petals in the second petal ring of the bottom head 101.

6) Welding the circular seams 104 between the lowermost petal ring and the second petal ring.

7) Repeating steps 4)-6) to complete assembling and welding of other petals except for the uppermost petal ring of the bottom head 101.

8) Assembling or joining the uppermost petal ring of the bottom head 101, and the longitudinal seam gaps between adjacent petals and the circular seam gaps between the uppermost petal ring and the petal ring adjacent thereto are adjusted by means of the locating jig 400 shown in FIG. 5, wherein during adjusting the circular seam gaps, elevation unfitness of upper end surfaces of the petals in the uppermost petal ring is reduced as small as possible while the requirements regarding the circular seam gaps are still met.

9) Welding the longitudinal seams 103 between the petals in the uppermost petal ring of the bottom head 101.

10) Welding the circular seams 104 between the uppermost petal ring and the petal ring adjacent thereto.

11) Measuring the elevation of the upper end surface of the uppermost petal ring of the bottom head 101, and marking, on the uppermost petal ring of the assembled bottom head, an elevation layer for a theoretical intersection line 105.

12) Cutting and polishing at the site the margin of the uppermost petal ring of the bottom head 101 to ensure the elevation of the end surface of the annular opening of the bottom head 101 is consistent with the theoretical intersection line 105.

13) Assembling or joining the cylinder plates 106, specifically, a longitudinal seam gap between adjacent cylinder plates 106 and a circular seam gap between the formed head cylinder ring 107 and the uppermost petal ring of the bottom head 101 are adjusted by the locating jig 400 shown in FIG. 5, to be more specific, the adjustment of the longitudinal seam gap and the circular seam gap is performed by adjusting the cylinder plates one by one, for example, by adjusting the gap between adjacent cylinder plates 106, and/or by adjusting radially inwards or outwards the positions of the cylinder plates 106 on the end surface of the annular opening of the head.

14) Welding the longitudinal seams 103 between the cylinder plates 106.

15) Welding the circular seam 104 between the head cylinder ring 107 and the uppermost petal ring (or the end surface of the annular opening) of the bottom head 101.

The above steps are only for schematically illustrating the inventive concept of the present invention; and the inventive concept may be applied to the head of other large-scale container. Further, if a top head module of the container is made first and a bottom head module is made next, the method for manufacturing the top head is similar to those above steps.

Concerning the above, the present invention provides a method for manufacturing a head module 100 of a large-scale container, the head module 100 being adapted to connect to one end of a cylindrical body 200 of the large-scale container, the method comprising steps of:

providing a head 101 having an annular opening, the head being composed of a plurality of petals 102;

providing a plurality of cylinder plates 106; and forming a head cylindrical ring 107, comprising connecting in order the plurality of cylinder plates 106 to the end surface of the annular opening and joining facing sides of all adjacent cylinder plates 106, the head cylinder ring 107 being adapted to connect to the one end of the large-scale container.

It should be noted that the cylindrical body 200 forms the main portion of the large-scale container, and the axial length thereof is much greater than that of the head cylindrical ring 107. Even if as described hereinafter, the cylindrical body 200 is divided into a plurality of cylindrical rings, the axial length of the cylindrical ring is much greater than that of the head cylindrical ring 107. The outer diameter of the annular opening may be greater than 8 m.

The step of forming the head cylindrical ring 107 may further comprises, before connecting in order the plurality of cylinder plates 106 to the end surface of the annular opening, making the end surface of the annular opening of the head 101 be consistent with a theoretical intersection line of the head. This may be achieved by cutting and polishing the open end of the annular opening. However, with precise design of the petals of the head, and with very small tolerance during installing, there is a possibility that the open end of the annular opening of the head is consistent with the theoretical intersection line without cutting and polishing. But, there is still a possibility that the end surfaces of the petals in the uppermost petal ring of the head are offset in the radial direction.

Alternatively, the step of connecting in order the plurality of cylinder plates 106 to the end surface of the annular opening and joining facing sides of all adjacent cylinder plates 106 comprises, based on the unfitness of the petals 102 at the annular opening of the head, adjusting gaps between adjacent cylinder plates, and/or adjusting radially inwards or outwards the positions of the cylinder plates 106 on the end surface of the annular opening of the head.

The head module 100 may be made of steel plates, and by welding, the petals 102 are assembled together, the cylinder plates 106 are connected to the end surface of the annular opening of the head, and the facing sides of the adjacent cylinder plates 106 are joined.

The head module 100 may comprise a bottom head module or top head module 300 of the steel safety shell.

The outer diameter of the annular opening is not less than 8 meters.

The present invention also relates to a method for manufacturing a head module of a large-scale container, the head module including a head and a head cylindrical ring formed integrally with the head, the method comprising steps of: providing the head cylindrical ring; making the end surface of one end of the head cylindrical ring be consistent with a theoretical intersection line of the head; and joining a plurality of petals, based on the end surface of the one end of the head, to form the head. The above method may be used to manufacture a top head module of the steel safety shell.

The present invention further relates to head module 100 for a large-scale container, the head module 100 is adapted to be connected with one end of a cylindrical body 200 of the large-scale container, wherein the head module comprises: a head 100 composed of a plurality of petals 102 and having an annular opening; and a head cylindrical ring 107, one end of which is connected to the annular opening, and the other end of which is adapted to be connected with the one end of the cylindrical body 200, wherein the head cylindrical ring 107 comprises a plurality of cylinder plates 106, each cylinder plate being connected to the end surface of the annular opening of the head 101, and facing sides of all adjacent cylinder plates 106 being joined.

A method for manufacturing a large-scale container will be described next.

The method for manufacturing a large-scale container comprises the following steps: providing a first head 101 having an annular opening at a first site, the first head being composed of a plurality of first petals 102, the first site may be regarded as the assembling site for the first head; providing a first head cylindrical ring 107 to the annular opening of the first head 101 at the first site to form a first head module 100; forming a cylindrical body 200 at a second site different from the first site, based on the size of the first head cylindrical ring 107; and assembling the first head module 100 and the cylindrical body 200, the first head module 100 being located at one end of the cylindrical body 200 in an axial direction of the cylindrical body, wherein the cross section of the first head cylindrical ring 107 perpendicular to the axial direction is the same as the cross section of the one end of the cylindrical body 200 perpendicular to the axial direction. The above method may be used to manufacture a large-scale container having a head at one end thereof. In the above method, the expression "the cross section . . . is the same as the cross section" means the first head cylindrical ring 107 and the one end of the cylindrical body 200 have substantially the same cross sectional shape, and the two cross sections are matched in size, so that the first head cylindrical ring 107 can be in abutting joint with the one end of the cylindrical body 200.

Alternatively, the step of providing a first head cylindrical ring 107 includes: making the end surface of the annular opening of the first head 101 be consistent with a theoretical intersection line of the first head, for example, by cutting and polishing the open end of the annular opening of the first head 101; providing a plurality of first cylinder plates 106; and connecting in order the plurality of first cylinder plates 106 to the end surface of the annular opening of the first head and joining facing sides of all adjacent first cylinder plates 106 to form the first head cylindrical ring 107. Further, the step of connecting in order the plurality of cylinder plates 106 to the end surface of the annular opening of the first head 101 and joining facing sides of all adjacent first cylinder plates 106 comprises, based on the unfitness of the first petals 106 at the annular opening of the first head 101, adjusting gaps between adjacent first cylinder plates 106, and/or adjusting radially inwards or outwards the positions of the first cylinder plates 106 on the end surface of the annular opening of the first head 101.

Alternatively, in the method of manufacturing a large-scale container, the cylindrical body 200 may be divided into n intermediate cylindrical rings, n is the smallest natural number which is greater than 1 and meets the following condition: $n \times Q \geq W$, Q is the maximum weight that can be lifted at the site for a single lifting, and W is the weight of the cylindrical body. For example, if the cylindrical body 200 comprises 10 intermediate cylindrical rings and the total weight thereof is 2,000 tons, while the maximum lifting weight of a lifting crane in the most extreme condition of the cylindrical ring is 800 tons. Through simulation analysis, in this condition the weight of the sling for lifting is 100 tons, thus, the cylindrical body may be divided according to the maximum weight 700 tons. In this case, n equals 3.

Correspondingly, the present invention relates to a large-scale container which comprises: a first head module 100; a cylindrical body 200, the first head module 100 being connected to one end of the cylindrical body 200 in an axial direction of the cylindrical body. The first head module 100 comprises: a first head 101 composed of a plurality of petals 106 and having an annular opening; and a first head cylindrical ring 107, one end of which is connected to the annular opening of the first head 101, and the other end of which is adapted to be connected with the one end of the cylindrical body 200, wherein the first head cylindrical ring 107 comprises a plurality of first cylinder plates 106 which are connected in order to the end surface of the annular opening of the first head 101, and facing sides of all adjacent first cylinder plates 106 being joined. The cross section of said the other end of the first head cylindrical ring 107 perpendicular to the axial direction is the same as the cross section of the one end of the cylindrical body 200 perpendicular to the axial direction.

The above method for manufacturing a large-scale container may be applied to manufacture a large-scale container having two heads respectively at both ends thereof. In this case, the method further comprises the steps: forming a second head module 300 (for example, the top head mentioned hereinafter, or other structure such as a flat plate) at a third site different from the second site, based on the size of the other end of the cylindrical body 200 in the axial direction; and assembling the second head module 300 to said the other end of the cylindrical body.

Alternatively, the step of forming a second head module 300 comprises: forming a second head 301 having an annular opening at the third site, wherein the second head 301 is composed of a plurality of second petals 302; and providing a second head cylindrical ring 304 to the annular opening of the second head 301 at the third site to form the second head module 300, wherein the cross section of the second cylindrical ring 307 perpendicular to the axial direction is the same as the cross section of said the other end of the cylindrical body 200 perpendicular to the axial direction. The word "same" regarding the cross section has the similar meaning mentioned above.

Alternatively, the step of providing a second head cylindrical ring 307 comprises: making the end surface of the annular opening of the second head 301 be consistent with a theoretical intersection line of the second head 301, for example, by cutting and polishing the open end of the annular opening of the second head; providing a plurality of second cylinder plates 306; and connecting in order the plurality of second cylinder plates 306 to the end surface of the annular opening of the second head 301 and joining facing sides of all adjacent second cylinder plates 306 to form the second head cylindrical ring 307.

Alternatively, the step of connecting in order the plurality of second cylinder plates 306 to the end surface of the annular opening of the second head 301 and joining facing sides of all adjacent second cylinder plates 306 to form the second head cylindrical ring 307 comprises, based on the unfitness of the petals at the annular opening of the second head 301, adjusting gaps between adjacent second cylinder plates 306, and/or adjusting radially inwards or outwards the positions of the second cylinder plates 306 on the end surface of the annular opening of the second head 301.

In the above step of forming a second head module 300, the second head 301 is formed first, and then the second head cylindrical ring 307 is formed to the second head 301. However, alternatively, the second head cylindrical ring 307 may be formed first, and in this case, the step of forming a second head module 300 comprises: forming a second head cylindrical ring 307 at the third site, based on the size of said the other end of the cylindrical body 200, wherein one end of the second head cylindrical ring 307 is adapted to be connected with said the other end of the cylindrical body 200, and the cross section of said one end of the second head cylindrical ring 307 perpendicular to the axial direction is the same as the cross section of said the other end of the cylindrical body 200 perpendicular to the axial direction; and joining a plurality of second petals 302 to form a second head 301, based on the size of the second head cylindrical ring 307, and connecting the second head cylindrical ring 307 to an annular opening of the second head 301.

Alternatively, the cylindrical body 200, the first and second head cylindrical rings 107 and 307 have a circular cylinder shape.

It should be noted that in the case that the two ends of the cylindrical body 200 in the axial direction are in the same size, the second head cylindrical ring 307 may be manufactured, based on the size of the first head cylindrical body 200, at the third site different from the second site. Thus, the cylindrical body 200 and the second head module 300 may be manufactured at the same time, which may shorten the construction period.

The top head module 300 of the steel safety shell 1000 may be manufactured by the following steps:

1) Completing the preparing work for manufacturing the top head module 300, that is, installing an assembling holder 700 for the bottom head module; manufacturing petals 302 for forming the top head 301, and head cylinder plates 306, wherein a reserved portion as a cutting margin of 5 mm-10 mm is provided at one end of the lowermost petal ring of the top head closer to the intersection line.

Figure 4:
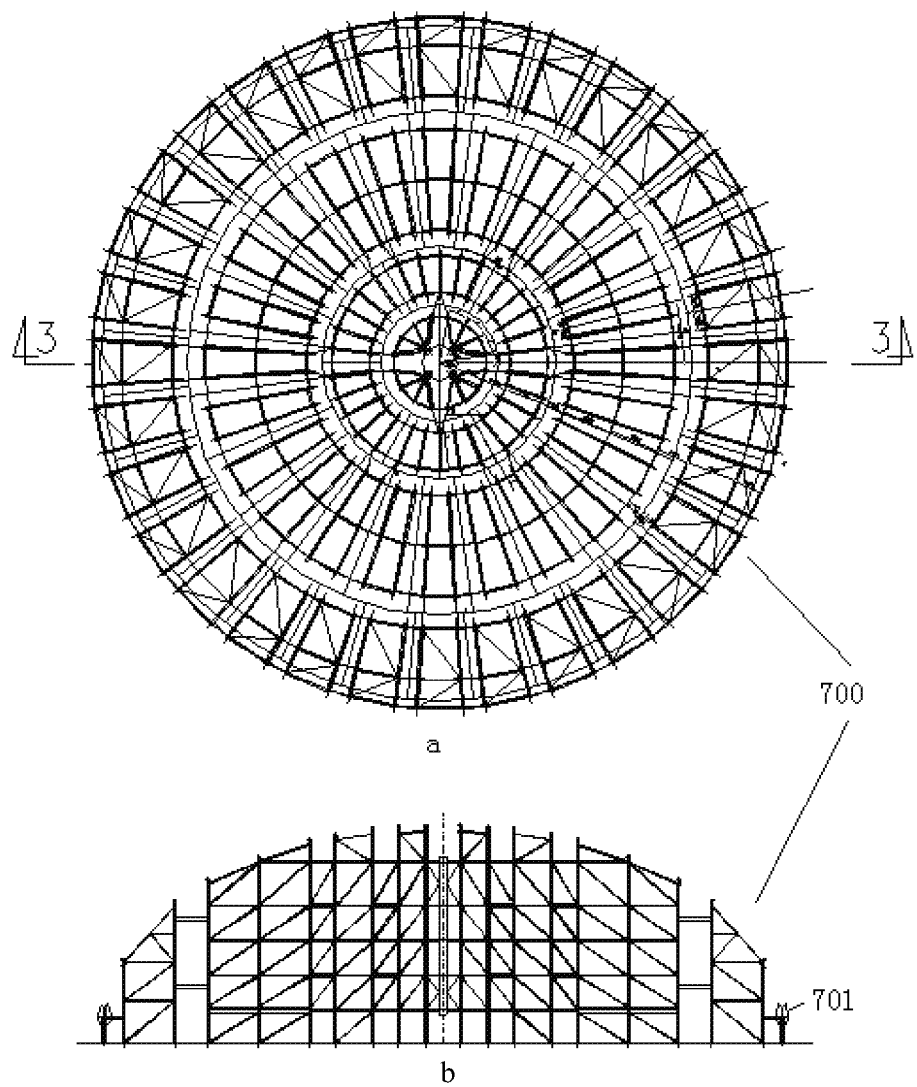

2) Assembling or joining the head cylinder plates 306 on the holder 700 shown in FIG. 4, and adjusting longitudinal seam gaps between adjacent head cylinder plates 306 through the locating jig 400 shown in FIG. 5. The cross section of a lower end of a top head cylindrical ring 307 formed by assembling or joining the head cylinder plates 306 is the same as the cross section of an upper end of an uppermost intermediate cylindrical ring of the assembled cylindrical body 200. The outermost supporting position of the holder 700 remains unchanged, however, the distance between two clamping plates 701 may be adjusted according to the thickness of the head cylinder plate 306. The lower end of the head cylinder plate 306 is placed between the clamping plates 701, and the upper end of the head cylinder plate 306 may be pulled by a chain to adjust the verticality of the head cylinder plate 306.

3) Welding longitudinal seams 303 between the head cylinder plates 306.

4) Measuring the elevation of the upper end surface of the head cylinder plate 306, and marking, on the assembled top head cylindrical ring 307, an elevation layer for a theoretical intersection line 305.

5) Cutting and polishing at the site the margin of the top head cylindrical ring 307 to ensure the elevation of the end surface of the annular opening of the top head cylindrical ring 307 is consistent with the theoretical intersection line 305.

6) Assembling or joining a first petal ring of the top head 301, and adjusting longitudinal seam gaps between the petals 302, and a circular seam gap between the first petal ring and the top head cylindrical ring 307, by means of the locating jig 400 shown in FIG. 5.

7) Welding the longitudinal seams 303 between the petals in the first petal ring.

8) Welding the circular seam 304 between the first petal ring of the top head 301 and the top head cylindrical ring 307.

9) Repeating steps 6)-8) to complete assembling and welding of other petals 302 of the top head 301.

When the bottom head module is manufactured later, the manufacturing steps thereof are similar to those above steps.

Correspondingly, the present invention further relates to a large-scale container having two heads. The large-scale container comprises:

a cylindrical body 200;

a first head module 100 connected to one end of the cylindrical body 200 in an axial direction of the cylindrical body, wherein the first head module 100 comprises: a first head 101 composed of a plurality of petals 106 and having an annular opening; and a first head cylindrical ring 107, one end of which is connected to the annular opening of the first head 101, and the other end of which is adapted to be connected with the one end of the cylindrical body 200, wherein the first head cylindrical ring 107 comprises a plurality of first cylinder plates 106 which are connected in order to the end surface of the annular opening of the first head 101, and facing sides of all adjacent first cylinder plates 106 being joined. The cross section of said the other end of the first head cylindrical ring 107 perpendicular to the axial direction is the same as the cross section of the one end of the cylindrical body 200 perpendicular to the axial direction; and a second head module 300 connected to the other end of the cylindrical body 200 in the axial direction, wherein the second head module 300 comprises: a second head 301 composed of a plurality of petals 306 and having an annular opening; and a second head cylindrical ring 307, one end of which is connected to the annular opening of the second head 301, and the other end of which is adapted to be connected with said the other end of the cylindrical body 200, wherein the second head cylindrical ring 307 comprises a plurality of second cylinder plates 306 which are connected in order to the end surface of the annular opening of the second head 301, and facing sides of all adjacent second cylinder plates 306 being joined. The cross section of said the other end of the second head cylindrical ring 307 perpendicular to the axial direction is the same as the cross section of said the other end of the cylindrical body 200 perpendicular to the axial direction.

Alternatively, the large-scale container comprises the steel safety shell. Further, the cylindrical body is divided into n intermediate cylindrical rings, wherein n is the smallest natural number which is greater than 1 and meets the following condition: $n \times Q \geq W$, wherein Q is the maximum weight that can be lifted at the site for a single lifting, and W is the weight of the cylindrical body.

How to adjust the position of the cylinder plate on the end surface of the annular opening of the head will be described below with reference to FIG. 6, in which the bottom head cylindrical ring 107 is taken as an example.

Figure 6:
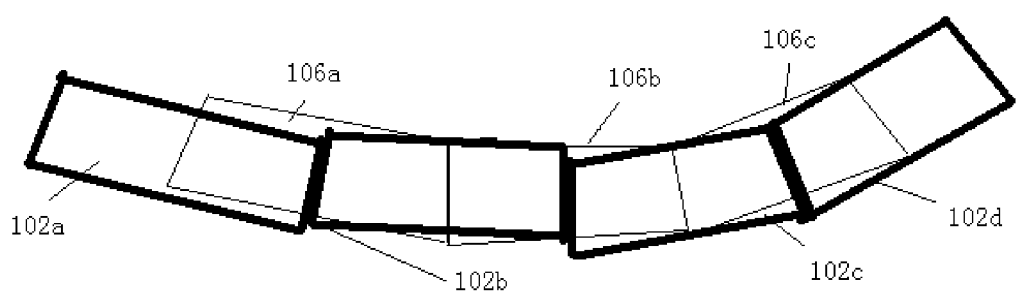
FIG. 6 is a partial schematic view showing connecting or welding cylinder plates to a bottom head.

In FIG. 6, the thick solid line indicates the end surface of the petals at the annular opening of the head, and the thin solid line indicates the cylinder plates. Further, four petals 102a, 102b, 102c and 102d, and three cylinder plates 106a, 106b and 106c are shown for illustrative purpose. As shown in FIG. 6, there are offsets in the radial direction between adjacent petals, which causes the shape of the annular opening of the head to represent a deformed shape. In order to reduce or remove the deformation, the radial positions of the cylinder plates 106a, 106b and 106c on the end surfaces of the petals are adjusted, and the gaps between the adjacent cylinder plates 106a, 106b and 106c are adjusted, so that the shape of the assembled head cylinder ring formed by the cylinder plates 106a, 106b, 106c and other cylinder plates 106 may correct the deformed shape.

With the solution of the present invention, compared to the existing module dividing method, at least one of the following advantages may be obtained:

1. The bottom head module of the present invention is constituted by the bottom head petals and the bottom head cylindrical ring. Thus, in order to ensure the level of the intersection line of the bottom head, only a margin of 5 mm-10 mm needs to be provided at the end of the petal closer to the intersection line. After completing the assembling of the petal ring on which the margin is provided, the petal ring can be cut and polished at the site to ensure the end surface of the petal ring is consistent with the intersection line of the bottom head. Accordingly, the level of the intersection line of the bottom head is ensured at the bottom head assembling site.

2. In the present invention, intersection line measuring, margin cutting, and circular seam unfitness adjustment of the bottom head intersection line are carried out at the bottom head assembling site, which reduces operation difficulty, improves efficiency, and increases the degree of freedom of the construction party for assembling the bottom head.

3. In the present invention, the circular seam gap between the head cylinder plates and the petals in the uppermost petal ring of the bottom head is adjusted by providing the position of each head cylinder plate, thus, the seam unfitness of the circular seam can be easily adjusted. Further, the cylindrical body is made according to the size of the head cylindrical ring, thus, when the cylindrical body and the head module are assembled, there is almost no possibility that the circular seam unfitness is out of tolerance. Therefore, the installation quality of the large-scale container is improved.

4. The head cylindrical ring itself may be used as the head strengthening ring, which reduces material cost and operation steps.

5. In the present invention, the cylindrical body is divided into intermediate cylindrical rings according to the maximum lifting weight of the lifting crane, thus, the number of the intermediate cylindrical rings (or the cylindrical ring module) is reduced as small as possible, which ensures the minimum times of transporting and lifting the intermediate cylindrical rings, and improves the economic efficiency of the overall installation.

6. Assembling the head and the cylindrical ring at different sites may minimize high-altitude construction.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A method for manufacturing a large-scale container, the large-scale container including a cylindrical body with a first end and a second end and a first head module, the method comprising the steps of:
    providing a first head having an annular opening on a first end of the first head, the first head being composed of a plurality of first petals;
    installing an assembling holder and placing the first petals of the first head onto the assembling holder;
    providing a first head cylindrical ring to the annular opening of the first head on the first end of the first head to form the first head module;
    forming the cylindrical body on a first end of the first head module based on a circumferential size of the first head cylindrical ring, wherein the first end of the first head module is connected to the first end of the cylindrical body; and
    assembling the first head module and the cylindrical body, the first head module being located at the first end of the cylindrical body in an axial direction of the cylindrical body,
    wherein the cross section of the first head cylindrical ring perpendicular to an axial direction is the same as the cross section of the first end of the cylindrical body perpendicular to the axial direction,
    wherein the step of providing a first head cylindrical ring includes the steps of:
        making an end surface of the annular opening of the first head be consistent with an intersection line of the first head, wherein the intersection line is between the first head cylindrical ring and the first head, and wherein the first head cylindrical ring and the first head intersect each other;
        providing a plurality of first plates; and
        connecting in order the plurality of first plates to the end surface of the annular opening of the first head and joining facing sides of all adjacent first plates to form the first head cylindrical ring.

2. The method according to claim 1, wherein the step of making the end surface of the annular opening of the first head be consistent with the intersection line of the first head comprises cutting and polishing the end surface of the annular opening of the first head.

3. The method according to claim 1, further comprising the steps of:
    forming a second head module based on a circumferential size of the second end of the cylindrical body in the axial direction; and
    assembling the second head module to the second end of the cylindrical body.

4. The method according to claim 3, wherein the step of forming the second head module comprises the steps of:
    forming a second head cylindrical ring based on the circumferential size of the second end of the cylindrical body, wherein a first end of the second head cylindrical ring is adapted to be connected with the second end of the cylindrical body, and a cross section of the first end of the second head cylindrical ring perpendicular to the axial direction is the same as the cross section of the second end of the cylindrical body perpendicular to the axial direction; and
    joining a plurality of second petals to form a second head, based on a circumferential size of the second head cylindrical ring, and connecting the second head cylindrical ring to an annular opening of the second head.

5. The method according to claim 4, wherein the step of joining the plurality of second petals to form the second head comprises the steps of:
    making an end surface of the second end of the second head cylindrical ring be consistent with an intersection line of the second head, wherein the intersection line is between the second head cylindrical ring and the second head, and wherein the second head cylindrical ring and the second head intersect each other; and
    joining the second petals, based on the circumferential size of the second end of the second head cylindrical ring, to form the second head.

6. The method according to claim 5, wherein the step of making the end surface of the second end of the second head cylindrical ring be consistent with the intersection line of the second head comprises cutting and polishing the second end of the second head cylindrical ring.

7. The method according to claim 3, wherein the step of forming the second head module comprises the steps of:
    forming a second head having an annular opening at a second end of the second head, wherein the second head is composed of a plurality of second petals; and
    providing a second head cylindrical ring to the annular opening at the first end of the second head to form the second head module, wherein a cross section of the second cylindrical ring perpendicular to an axial direction is the same as a cross section of the second end of the cylindrical body perpendicular to the axial direction.

8. The method according to claim 7, wherein the step of providing the second head cylindrical ring comprises the steps of:
    making an end surface of the annular opening of the second head be consistent with an intersection line of the second head, wherein the intersection line is between the second head cylindrical ring and the second head, and wherein the second head cylindrical ring and the second head intersect each other;
    providing a plurality of second plates; and
    connecting in order the plurality of second plates to the first end of the annular opening of the second head and joining facing sides of all adjacent second plates to form the second head cylindrical ring.

9. The method according to claim 8, wherein the step of making the end surface of the annular opening of the second head be consistent with the intersection line of the second head comprises cutting and polishing the first end of the annular opening of the second head.

10. The method according to claim 2, wherein the large-scale container comprises a steel safety shell used in a nuclear power plant.

11. The method according to claim 10, wherein the cylindrical body is divided into n intermediate cylindrical rings, wherein n is the smallest natural number which is greater than 1 and meets a condition: n×Q≥W, wherein Q is a maximum weight that can be lifted by a lifting apparatus at a site for a single lifting, and W is a weight of the cylindrical body.

* * * * *